(12) United States Patent
Diaz

(10) Patent No.: US 12,258,905 B2
(45) Date of Patent: Mar. 25, 2025

(54) METHOD AND SYSTEM OF MONITORING A COMPONENT OF AN AIRCRAFT

(71) Applicant: Rolls-Royce Deutschland Ltd & Co KG, Blankenfelde-Mahlow (DE)

(72) Inventor: Carlos Enrique Diaz, Garching (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 88 days.

(21) Appl. No.: 17/546,866

(22) Filed: Dec. 9, 2021

(65) Prior Publication Data

US 2022/0186666 A1    Jun. 16, 2022

(30) Foreign Application Priority Data

Dec. 15, 2020 (EP) ..................................... 20214196

(51) Int. Cl.
*F02C 7/18*      (2006.01)
*F01D 21/14*      (2006.01)
(Continued)

(52) U.S. Cl.
CPC ................ *F02C 7/18* (2013.01); *F01D 21/14* (2013.01); *F02C 7/14* (2013.01); *F02C 7/224* (2013.01);
(Continued)

(58) Field of Classification Search
CPC ........ G01S 13/88; G01S 7/412; G01S 13/536; G01S 7/354; G01S 7/41; G01S 7/417; F01D 21/003; F01D 21/12; F01D 11/14; F01D 17/085; F01D 11/00; B64D 2045/0085; B64D 45/00; B64D 27/10; B64D 27/16; B64D 13/02; B64D 13/06; B64D 15/04;
(Continued)

(56) References Cited

U.S. PATENT DOCUMENTS 10,705,198 B2 *   7/2020   Santra ...................... G01M 1/16
11,181,409 B2 *   11/2021   Reepmeyer ............... F02C 7/14
(Continued)

OTHER PUBLICATIONS

European Search Report dated Jun. 4, 2021 from counterpart European Patent Application No. 20 214 196.6.

*Primary Examiner* — Alvaro E Fortich
*Assistant Examiner* — Martin Walter Braunlich
(74) *Attorney, Agent, or Firm* — SHUTTLEWORTH & INGERSOLL, PLC; Timothy J. Klima

(57) ABSTRACT

A gas turbine engine for an aircraft that includes a nacelle, a fan, an engine core, a bypass duct extending between the engine core and the nacelle and guiding a bypass airflow through the bypass duct, and at least one non-structural strut extending in the radial direction within the bypass duct, wherein the non-structural strut includes an outside wall acting as a heat exchanger, and wherein the outside wall includes first transport means configured to transport in the outside wall at least one fluid to be cooled. It is provided that the non-structural strut further includes second transport means configured to transport a fluid to be heated, wherein the first transport means and the second transport means are configured such that the fluid to be heated is heated by the at least one fluid to be cooled and the at least one fluid to be cooled is cooled both by the bypass airflow and the fluid to be heated.

15 Claims, 10 Drawing Sheets

(51) Int. Cl.
*F02C 7/14* (2006.01)
*F02C 7/224* (2006.01)
*G01M 99/00* (2011.01)
*G01S 13/88* (2006.01)

(52) U.S. Cl.
CPC ............. *G01M 99/00* (2013.01); *G01S 13/88* (2013.01); *F05D 2220/323* (2013.01); *F05D 2260/213* (2013.01); *F05D 2260/22141* (2013.01); *F05D 2260/232* (2013.01); *F05D 2260/606* (2013.01); *F05D 2260/98* (2013.01)

(58) Field of Classification Search
CPC ..... B64D 2013/0603; B64D 2045/009; G01M 3/002; G01M 15/14; F05D 2260/80; F05D 2220/323; F05D 2220/36; F05D 2260/83; F05D 2270/805; F05D 2270/821; F05D 2270/3032; F05B 2260/80; G01F 1/663; G01F 1/74; G01P 3/00; G01P 3/48; G01R 27/04
See application file for complete search history.

(56) References Cited

U.S. PATENT DOCUMENTS

| | | |
|---|---|---|
| 2012/0242351 A1 | 9/2012 | Hochreutiner et al. |
| 2012/0242537 A1 | 9/2012 | Kluczewski |
| 2017/0211411 A1 | 7/2017 | Shepard |
| 2019/0212435 A1 | 7/2019 | Pfeifer et al. |
| 2019/0302252 A1 | 10/2019 | Santra et al. |
| 2019/0375520 A1* | 12/2019 | Parker ................ G01M 5/0091 |
| 2020/0248580 A1* | 8/2020 | Scarborough .......... B64D 45/00 |
| 2024/0288337 A1* | 8/2024 | Dorbala ................ G01M 15/02 |

* cited by examiner

METHOD AND SYSTEM OF MONITORING A COMPONENT OF AN AIRCRAFT

This application is the National Phase of International Application PCT/EP2020/066049 filed Jun. 10, 2020 which designated the U.S.

This application claims priority to German Patent Application No. DE 10 2019 116 240.8 filed Jun. 14, 2019, which applications are incorporated by reference herein.

This application claims priority to European Patent Application EP 20 214 196.6 filed Dec. 15, 2020, the entirety of which is incorporated by reference herein.

DESCRIPTION

The present disclosure relates to a method and system of monitoring a component of an aircraft.

An early detection of mechanical failures in a gas turbine engine such as a burst duct, combustor burn through, or compressor bleed valve failure that lead to an increase of temperature and pressure in compartments of an aircraft is desired to avoid damage of engine components or the engine nacelle.

Document US 2020/0248580 A1 discloses a system for detecting a ruptured duct transporting a high-temperature fluid within a gas turbine engine. One or more rupture sensing elements disposed along a rupture detection line are configured to detect the presence of a heated fluid.

One problem associated with known systems for detection of mechanical failures lies in that the failure is only detected once it is substantial, leaving multiple conditions that still drive the propulsion system design undetected. For example, a burst duct may remain undetected where the air temperature is just below the fire loops threshold temperature. In another example, local effects of a combustor burn through may create a very small orifice in the bypass duct only, leaving such burn through undetected. There is thus a need to improve the detection of mechanical failures of components in a gas turbine engine.

The object underlying the present invention is to provide a detection system and method that allow to detect mechanical failures in an aircraft at an early stage and in a reliable manner.

The invention provides for a method and a system with features as disclosed herein. Embodiments of the invention are also disclosed herein.

According to a first aspect of the invention, a method of monitoring a component of an aircraft in order to detect a mechanical failure of the component is provided. The method comprises the steps of:

providing a radar sensing element installed within a portion of the aircraft that is configured to transmit and detect radio waves;

determining a state devoid of mechanical failure of the component by interrogating the component by transmitting radio waves from the radar sensing element to the component, detecting the waves reflected from the component, determining at least one property value of the reflected waves, and associating this property value with a characteristic of the component in the state devoid of mechanical failure;

subsequently determining a current state of the component by interrogating the component by transmitting radio waves from the radar sensing element to the component, detecting the waves reflected from the component, and determining the at least one property value of the reflected waves;

determining if the at least one property value identified in the current state of the component has changed from the respective property value in the state devoid of mechanical failure in a manner indicative of a mechanical failure.

Aspects of the invention are thus based on the idea of using radar technology to monitor a component of an aircraft such as a component of a gas turbine engine or other propulsion system. A radar sensing element determines at least one property value of the reflected waves that is indicative of characteristics of the component such as size, shape, orientation, material, distance, and/or velocity. If a Doppler radar is used, which is the case in embodiments, vibrations, and changes in the vibration frequency in a component may be monitored as well. The at least one property value is first determined for an initial state of the component in which it is devoid of mechanical failure. Subsequently, the at least one property value are determined for a current state of the component. If the at least one property value identified in the current state of the component has changed from the respective property value in the state devoid of mechanical failure in a manner indicative of a mechanical failure, the presence of a mechanical failure is determined and may be reported, e.g., to a security system or an on-board communication unit.

To determine properties of the elements, the radar sensing element interrogates the component by transmitting radio waves from the radar sensing element to the component and detecting the waves reflected from the component. In this respect, it is pointed out that the radar sensing element may be a single component which both emits the radio waves and detects the reflected radio waves (transmitter and receiver in one component) or may comprise a separate transmitter and receiver which may be located in separate locations.

Further, it is pointed out that the present invention is not limited to any particular radar technology. For example, the emitted radio wave may be a pulsed signal or a continuous wave signal. In embodiments, frequency modulated continuous wave (FMCW) radar and direct-sequence spread spectrum (DSSS) radar is implemented.

In an embodiment, determining if the at least one property value has changed in a manner indicative of a mechanical failure comprises determination if the at least one property value has changed in an amount that is above a predefined threshold. In such case a mechanical failure is identified. Accordingly, in this embodiment, a threshold has been previously defined which considers a fluctuation of the radar measured property value that is not of concern. However, when the actual value of the property value differs from the value in which the component is devoid of mechanical failure surpasses this threshold, this is indicative of a mechanical failure of the monitored component. For example, if the measured property is time delay (which is equivalent to the distance of the component from the radar sensing element and thus further equivalent to the location of the component), and the time delay changes in an amount that is above a threshold (the threshold, e.g., considering vibrations of the component that shall not be interpreted as a mechanical failure), a state of mechanical failure is determined.

In another embodiment, for determination of a mechanical failure artificial intelligence is implemented. In this embodiment, determination if the at least one property value has changed in a manner indicative of a mechanical failure comprises using an artificial intelligence engine that has been trained with property value data indicative of the state devoid of mechanical failure and/or with property value data indicative of states of mechanical failure. In embodiments, the artificial intelligence engine may be configured to employ at least one of: supervised machine learning, recursive neural networks, unsupervised machine learning, algorithmically-defined machine learning.

This embodiment is based on the idea to train an artificial intelligence engine with property value data that define the state of the component devoid of mechanical failure and with property value data that define states of mechanical failure of the component. As there may be a plurality of scenarios in which a mechanical failure occurs, it is preferable that different states of mechanical failure are trained to the artificial intelligence engine.

The property value data used for training are data determined by radar interrogation of the component. After training the artificial intelligence engine to discriminate between the state devoid of mechanical failure and states of mechanical failure, the artificial intelligence engine then decides in accordance with its artificial intelligence if an actual value of at least one of the properties that has been determined by the ongoing radar interrogation is indicative of a mechanical failure or not.

As mentioned before, the at least one property value of the reflected waves may be indicative of at least one of size, shape, orientation, material, distance, and velocity of the component, which are characteristics of the component. A change in size, shape, orientation, material, distance, and velocity of the component can be determined with standard radar technology which may rely on pulsed signals or continuous wave signals, determining, e.g., the runtime of a pulsed signal or the spectrum of a continuous wave signal. In an embodiment, subtle information such as a change of size, shape and orientation may be determined by interrogating with the radar sensing element different parts or areas of the component as will be discussed below.

The claimed invention has potentially a high number of applications in an aircraft for detecting mechanical failures of components of the aircraft. Non-limiting embodiments in an aircraft propulsion system regard that the mechanical failure includes at least one of the following scenarios: a burst engine duct, a combustor burn-through, a compressor bleed valve opening failure, a liquid (oil, fluid, hydraulic fluid) pipe leak and a cooling system airflow failure. For example, in an embodiment, the inventive method may detect an anti-ice duct rupture, wherein the radar sensing element is located in an inlet compartment of a nacelle. In another example, the inventive method may detect a burst duct in an Environmental Control System (ECS), wherein the radar sensing element is located in a fan compartment. In other examples, the inventive method may detect a failed compressor bleed valve, or a combustor burn through. The invention may further detect the presence of a liquid in a location where it should not be, thereby detecting fuel leaks, oil leaks and/or hydraulic fluid leaks, such detection potentially preventing fires.

As small changes in size, shape and orientation can also be determined by the use of radar technology, other applications of the invention regard the detection of fuel/oil pipe ruptures, a delamination damage in a composite material, the detection of abnormal vibrations in pumps, pipes or heat exchangers, the detection of a changed position of pipes, an abnormal mechanical behavior of gearbox harnesses, and/or abnormal mechanical behavior of any other installation in a gas turbine engine.

According to an embodiment, the radar sensing element is configured to steer a beam of radio waves into different directions. In other words, the transmitter of the radar sensing element has the ability to transmit the radio waves in a particular direction. The beam may be steered mechanically or electronically. For example, the radar sensing element may comprise a phased array antenna, wherein a computer-controlled array of antennas which creates a beam of radio waves can be electronically steered to point in different directions without moving the antennas.

Such steering of the beam of radio waves may be used to create a complete map of the component/object that is monitored. For example, if the component extends in space, the at least one property value of the component is determined for a plurality of different areas of the component. In this manner, different spatial areas of the component can be monitored separately and with a higher granularity. Differentiating between different spatial areas of a component also allows to detect subtle mechanical failures such as deformations and holes of/in a component.

In a further embodiment,
the at least one property value is time delay, wherein changes in the time delay between transmission of the radio waves and detection of the reflected radio waves is monitored, and/or
the at least one property value is energy, wherein changes in the energy of the detected radio wave is monitored, and/or
the at least one property value is a frequency spectrum of the radio waves, wherein changes in the frequency spectrum of the detected radio waves are monitored.

However, other properties or parameters of the reflected radio waves may be determined as well, such as Doppler shift. The value of a radar related property of the reflected waves suitable to identify a characteristic or attribute of the component may be determined.

In a further embodiment, a plurality of properties of the component are determined to define the state devoid of mechanical failure, wherein the step of determining if the at least one property value has changed in a manner indicative of a mechanical failure comprises that changes of the plurality of properties are monitored to determine changes indicative of a mechanical failure. The more properties are monitored, the better the reliability of the results.

In an embodiment, a radar sensing element with a power consumption is used that is less than 1 Watt, in particular less than 0.4 Watt. The power consumption may be 0.3 Watt.

It is pointed out that a subsequent interrogation of a current state of the component (subsequent to defining the state devoid of mechanical failure) can be carried out at defined time intervals or continuously. Both modes of operation are possible. If a current state is determined in intervals only, the energy consumption can be reduced.

In a further aspect of the invention a system of monitoring a component of an aircraft is provided. The system comprises:
a radar sensing element installed within a portion of the aircraft that is configured to transmit and detect radio waves; and
a control and evaluation unit in communication with the radar sensing element and receiving information from the radar sensing element,
wherein the control and evaluation unit is configured to determine in cooperation with the radar sensing element a state devoid of mechanical failure of the component by interrogating the component by transmitting radio waves from the radar sensing element to the component, detecting the waves reflected from the component, determining at least one property value of the reflected waves, and associating this property value with a characteristic of the component in the state devoid of mechanical failure;

wherein the control and evaluation unit is further configured to subsequently determine a current state of the component by interrogating the component by transmitting radio waves from the radar sensing element to the component, detecting the waves reflected from the component, and determining the at least one property value of the reflected waves; and wherein the control and evaluation unit is further configured to determine if the at least one property value identified in the current state of the component has changed from the respective property value in the state devoid of mechanical failure in a manner indicative of a mechanical failure.

To carry out the mentioned operations, the control and evaluation unit may comprise a processor and a memory communicatively coupled with the processor, the memory storing instructions which, when executed by the processor, perform the mentioned operations of determining a state devoid of mechanical failure, of determining a current state, and of determining a change in at least one property value identifying a characteristic of the component.

The radar sensing element may be installed within a portion of a gas turbine engine including the engine nacelle, or any aircraft compartment like the pylon or the cargo bay.

The system is provided and configured to carry out the steps of the method as disclosed herein.

Accordingly, in an embodiment, the control and evaluation unit is configured to determine if the at least one property value has changed in a manner indicative of a mechanical failure in that it determines if the at least one property value has changed in an amount that is above a predefined threshold, in which case a mechanical failure is identified.

In another embodiment, the control and evaluation unit is configured to determine if the at least one property value has changed in a manner indicative of a mechanical failure by using artificial intelligence, wherein an artificial intelligence engine has been trained with property value data indicative of the state devoid of mechanical failure and/or with property value data indicative of states of mechanical failure.

In a further embodiment, the control and evaluation unit is configured to determine a mechanical failure that includes at least one of: a burst engine duct, a combustor burn-through, a compressor bleed valve opening failure, a fuel pipe leak, an oil pipe leak, and hydraulic pipe leak, any pressurized air duct, and a cooling system airflow failure.

The control and evaluation unit may be configured to determine at least one property value of the reflected waves that is indicative of at least one of size, shape, orientation, material, distance, and velocity of the component.

The sensor sensing element may be configured to steer a beam of radio waves into different directions.

In a still further aspect of the invention, a computer program product comprising program code for performing the steps of the method when said program is run on a computer, is disclosed herein.

The invention will be explained in more detail on the basis of exemplary embodiments with reference to the accompanying drawings in which.

Figure 12:
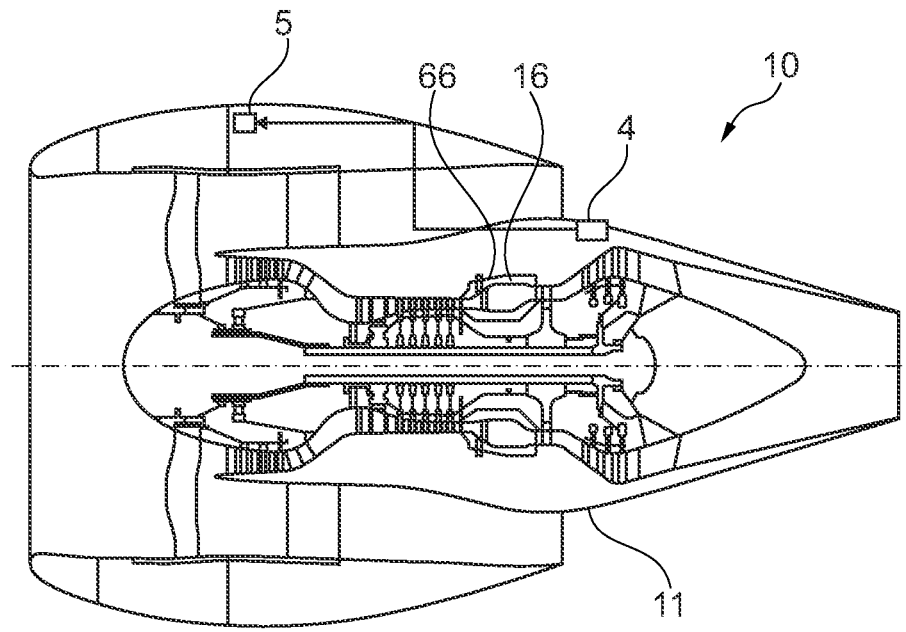
Figure 13:
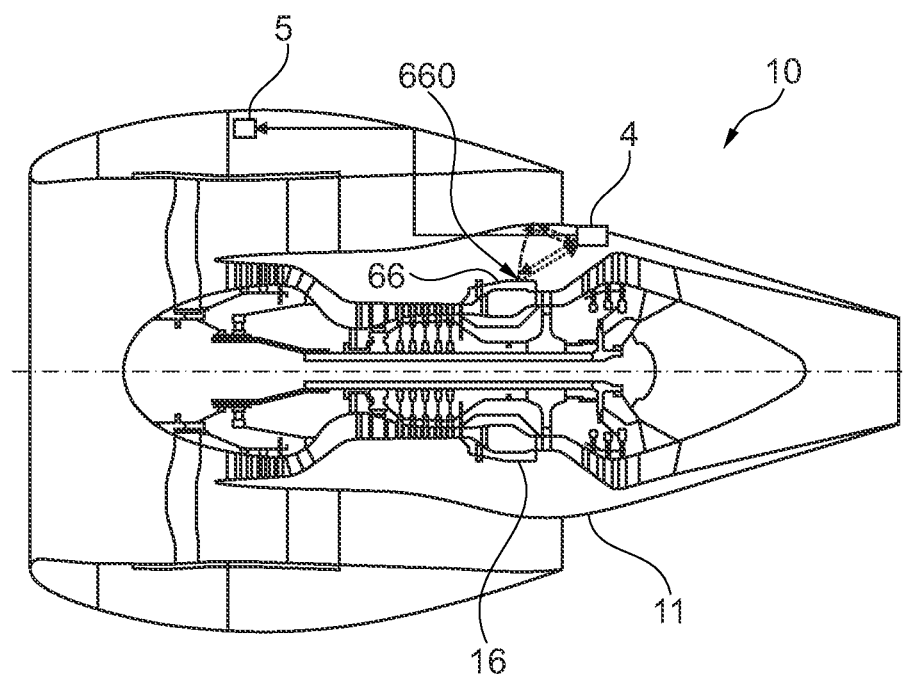
Figure 14:
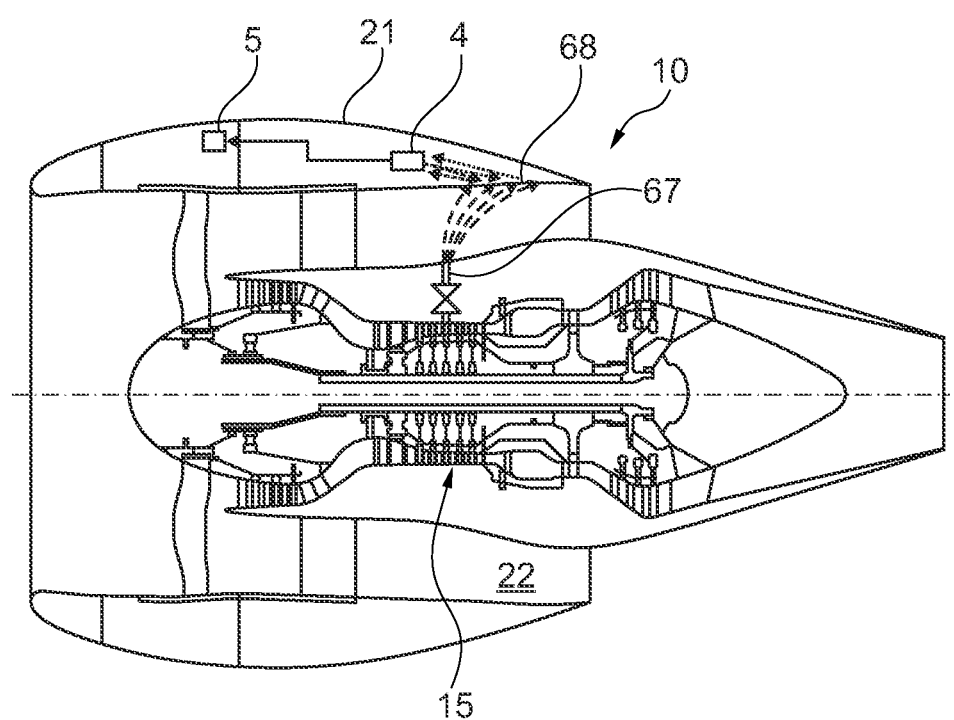

FIGS. 12, 13 is a gas turbine engine with a radar sensing element and an associated control and evaluation unit, wherein a combustor case of the core engine is monitored and a burn through of the combustor case is detected; and FIG. 14 is a gas turbine engine with a radar sensing element and an associated control and evaluation unit, wherein a bleed valve is monitored and a bleed valve failure condition is detected.

Figure 1:
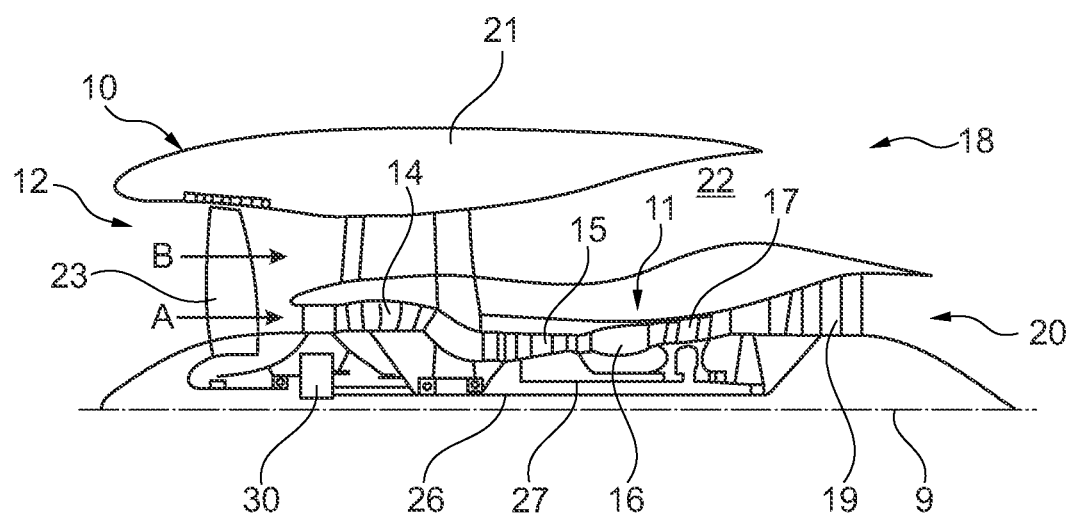
FIG. 1 is a simplified schematic sectional view of a gas turbine engine in which the present invention can be realized.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In the context of the present invention, a method and system of monitoring one or several components of the gas turbine engine are of relevance. The method and system are described in a general manner in FIGS. 2 to 5. FIGS. 6 to 14 regard embodiments of monitoring and detecting mechanical failures of different components of a gas turbine engine.

Figure 2:
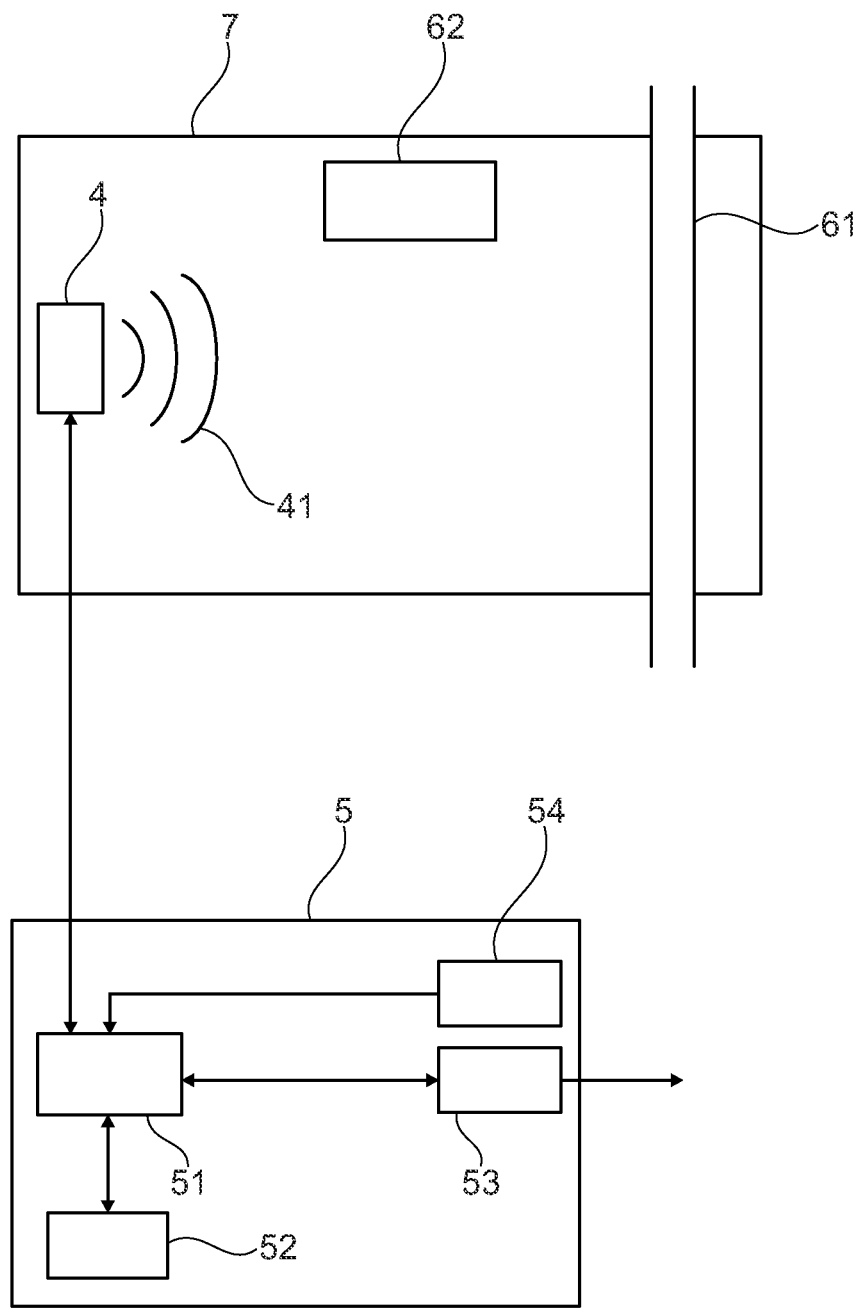
FIG. 2 is a schematic depiction of a system of monitoring a component of a gas turbine engine, the system comprising a radar sensing element and a control and evaluation unit for determining a mechanical failure of the monitored component.

FIG. 2 depicts a system in which a radar sensing element 4 is located in a chamber 7 of a gas turbine engine. The chamber 7 may be, e.g., a nacelle, a bypass duct or a core engine compartment of the gas turbine engine. Within chamber 7 is located as first component 61 a duct which passes through the chamber 7. Within chamber 7, there is further located a second component 62.

The radar sensing element 4 emits radio waves 41 which are transmitted to the components 61, 62 and reflected by the components 61, 62. Radar sensing element 4 may be a sensor of small size such as 8×10 mm size and with a power consumption in the range between 300 mW and 1000 mW. Components 61, 62 located within the beam of the radar sensing element 4 reflect some portion of the beam energy back to the radar sensing element 4, wherein an antenna (not shown) of the radar sensing element 4 detects the reflected radio waves. Of course, the depiction of two components 61, 62 in FIG. 2 is to be understood as an example only. There may be located only one component in compartment 7 or more than two components in compartment 7. Also, the monitored component may be a wall or a part of a wall of the chamber 7.

Radar sensing element 4 is connected to a control and evaluation unit 5 which controls the radar sensing element 4 and receives information/data from the radar sensing element 4. In particular, at least one property value of the reflected waves which are detected by the radar sensing element 4 is determined and provided to the control and evaluation unit 5. Determination of the property value may be performed in the radar sensing element 4 or in the control and evaluation unit 5. The property value that is determined from the detected reflected waves is, e.g., a time delay value, an energy value or one or several values of a frequency spectrum.

The control and evaluation unit 5 may be an Electronic Engine Control (EEC) unit of the gas turbine engine or a functional part of such EEC. The EEC is a digital control unit that combines engine sensor information with cockpit instructions to ensure that the engine performs both safely and at an optimal level. However, in principle, the control and evaluation unit 5 may be a unit separate from the EEC and interacting with the EEC. As all other components in FIG. 1, the control and evaluation unit 5 is depicted only schematically.

More particularly, the control and evaluation unit 5 comprises a central processing unit 51 which receives data from the radar sensing element 4. The control and evaluation unit 5 further comprises a power source 54, a mass storage memory 52 in communication with the central processing unit 51 and in interface 53 for sending data, e.g., to an aircraft on-board communication unit. It is pointed out that only the components of the control and evaluation unit 5 relevant for the present invention are depicted in FIG. 2.

Figure 3:
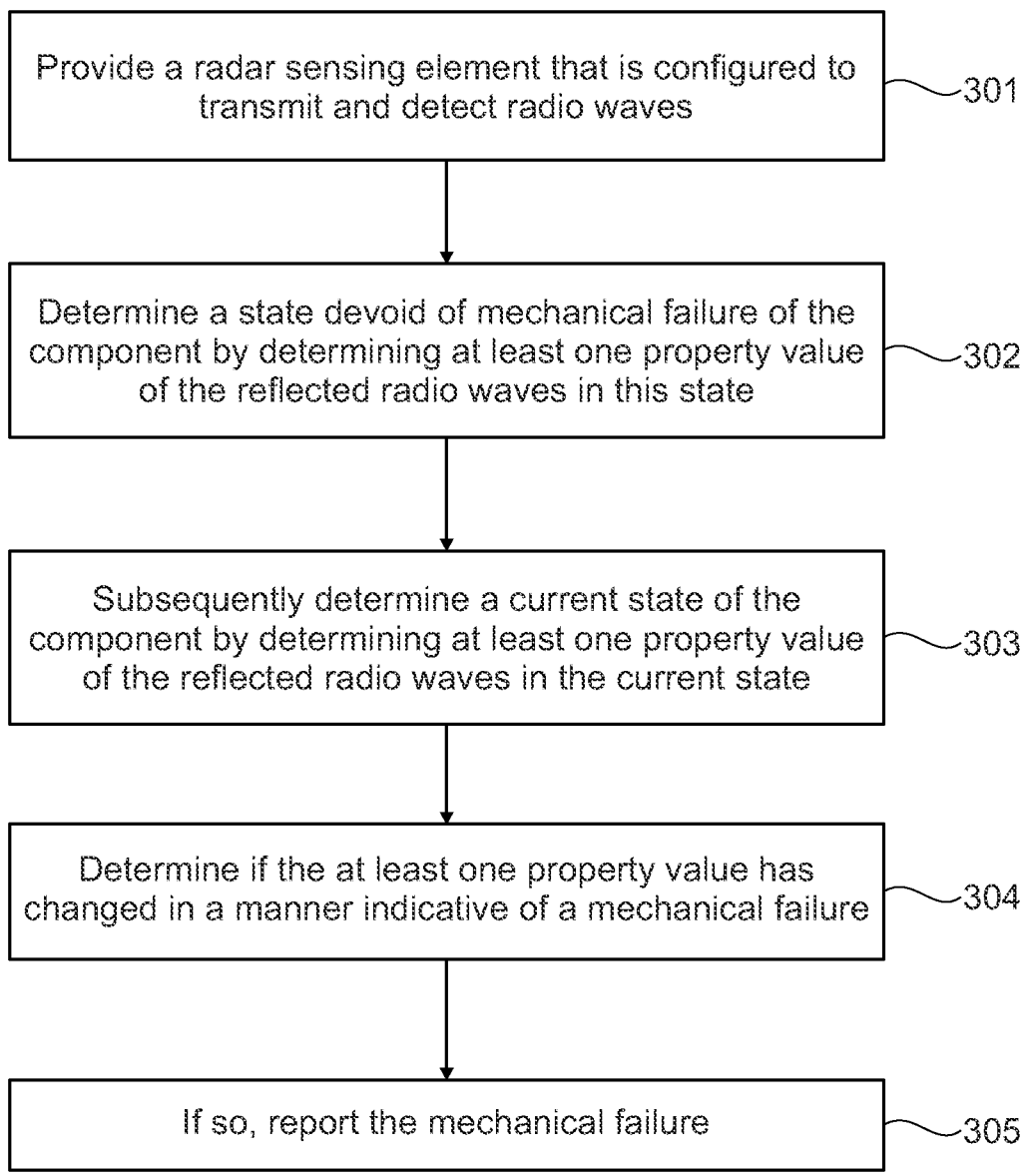
FIG. 3 is a flowchart of a method to detect a mechanical failure of a component of a gas turbine engine.
Figure 4:
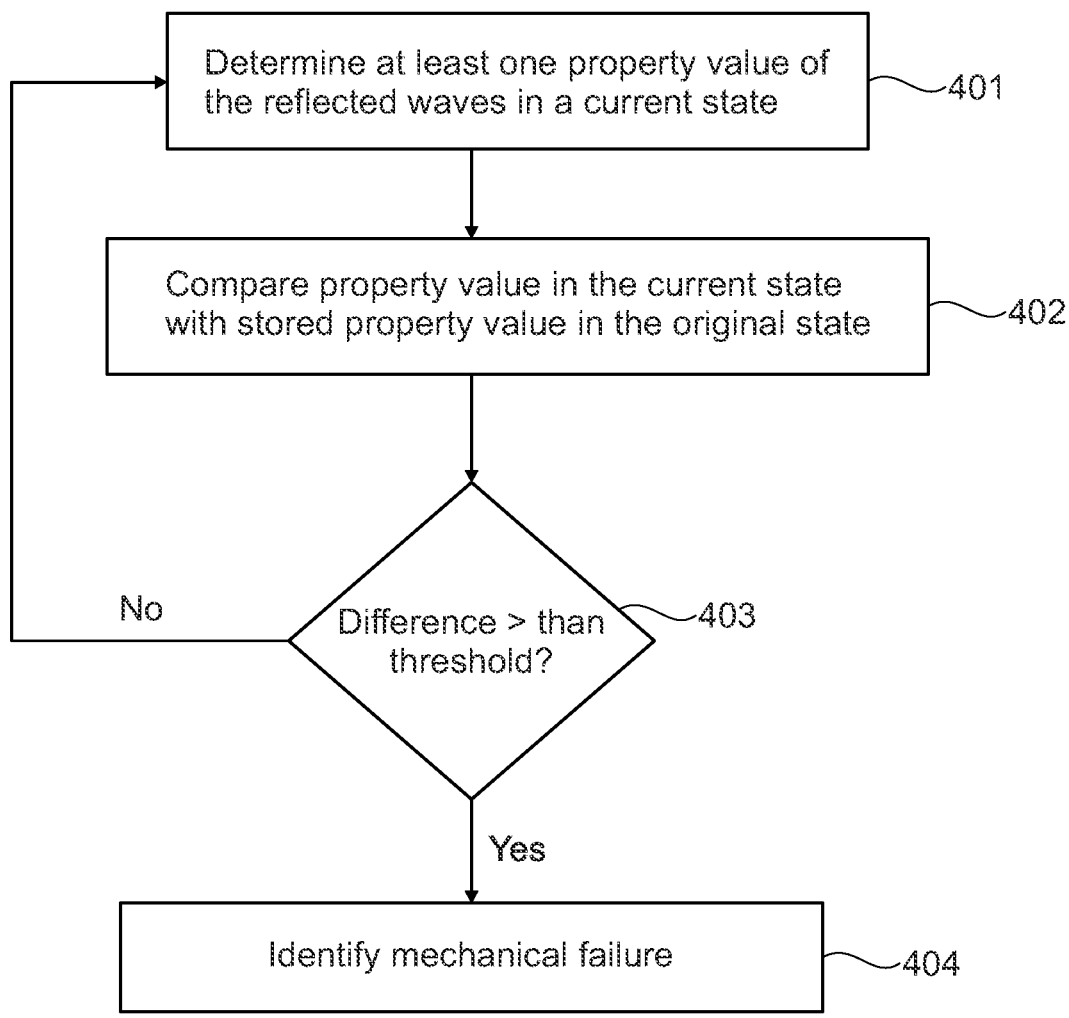
FIG. 4 is a flowchart of one method of determining if a property value is indicative of a mechanical failure in the flowchart of FIG. 3.

Program instructions are stored in memory 52 which cause, when executed by central processing unit 51, the performance of method steps as discussed with respect to FIGS. 2 to 4.

FIG. 3 depicts a method of detecting a mechanical failure of a component which, in principle, may be any component in a gas turbine engine. In step 301, a radar sensing element is provided that is configured to transmit and detect radio waves, such as radar sensing element 4 of FIG. 2. In step 302, a state devoid of mechanical failure of the component is determined. Such determination is made by determining at least one property value of radio waves that have been transmitted from the radar sensing element to the component and have been reflected from the component, the component being in the state devoid of mechanical failure. Such a property value may be, e.g., a time delay value, an energy value or a value of a frequency spectrum. Such value is indicative of a characteristic of the component such as size, shape, orientation, material, distance, and velocity of the component in the state devoid of mechanical failure.

In step 303, subsequently, a current state of the component is determined, wherein the at least one property value of the reflected radio waves is determined in the current state. Again, such at least one property value is determined using radar technology and the radar sensing element.

In step 304, it is determined if the at least one property value has changed in a manner indicative of a mechanical failure. In such case, according to step 305, a mechanical failure is reported, e.g., by sending a warning signal through interface 53 to an aircraft on-board communication unit.

Figure 5:
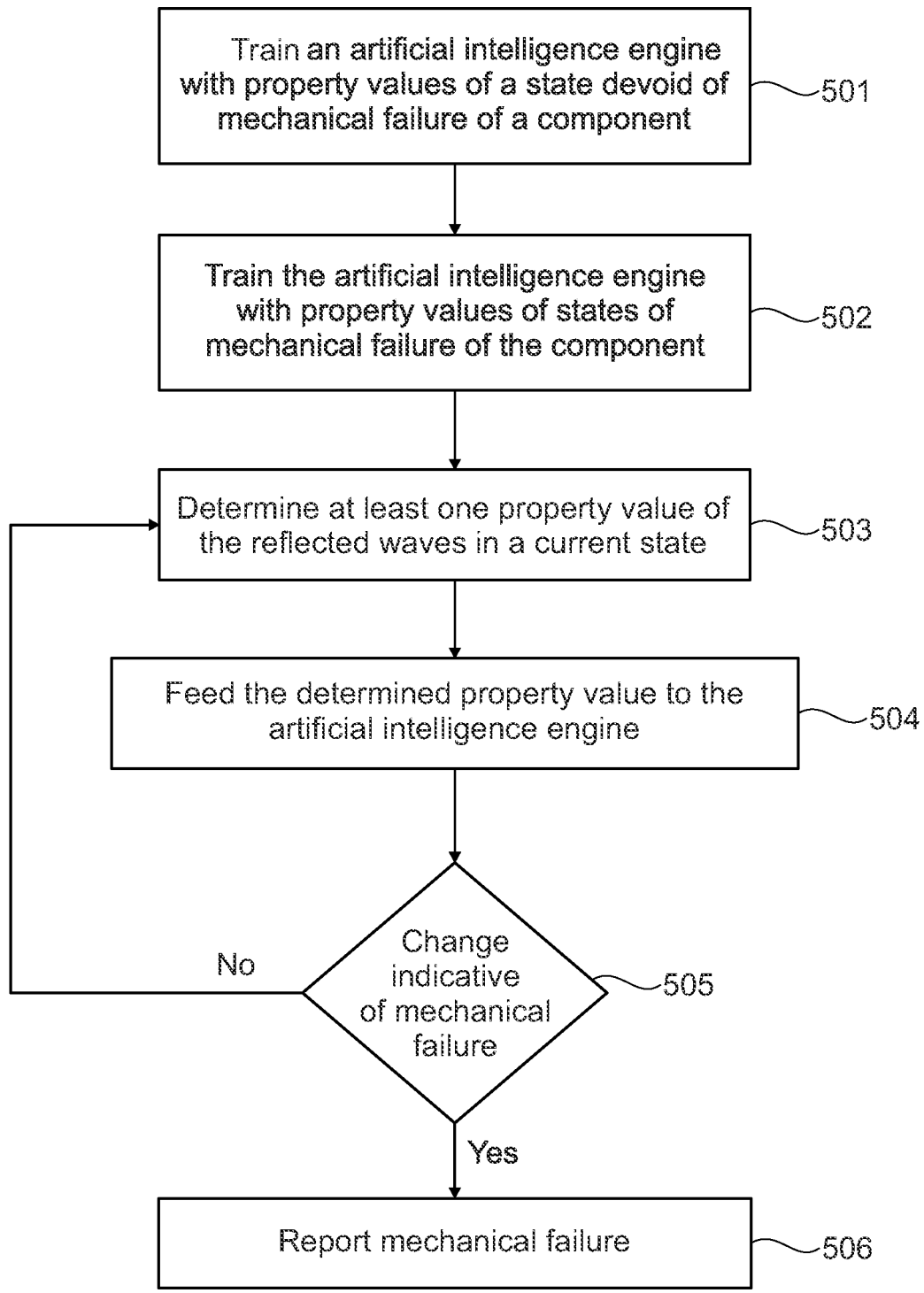
FIG. 5 is a flowchart of another method of determining if a property value is indicative of a mechanical failure in the flowchart of FIG. 3.

FIGS. 4 and 5 discuss two different embodiments of how the determination of step 304 of FIG. 3 that a mechanical failure is present is made.

According to the method of FIG. 4, in step 401, at least one property value of the reflected waves in the current state is determined. In step 402, this property value of the current state is compared with a stored property value in the original state, i.e., the state devoid of mechanical failure. Such original state property value may be stored in memory 52 of FIG. 2. In step 403, a comparison is made if the property value between the original state and the current state differs at least by a specified amount. Accordingly, it is determined if the difference between the two values is larger than a predefined threshold. In such case, according to step 404, a mechanical failure is identified. If the difference is below the threshold, a mechanical failure is not identified and the method continues in step 401 with determination and evaluation of further current property values.

In the method according to FIG. 5, artificial intelligence is implemented to determine if a mechanical failure is present. In step 501, and artificial intelligence engine is trained with property values of the state devoid of mechanical failure of the component. For example, a plurality of properties of the waves reflected from the component in the state devoid of mechanical failure are determined and stored, e.g., in memory 52 of control and evaluation unit 5 of FIG. 2.

Further, in step 502, the artificial intelligence engine is trained with property values of states of mechanical failure of the component. For example, several possible failure scenarios are implemented such as a burst duct or a burned through surface having a hole. For these failure scenarios, a plurality of properties of the waves reflected from the component are determined and also stored, e.g., in memory 52 of control and evaluation unit 5 of FIG. 2.

In one embodiment, only step 501 or step 502 is implemented. However, to increase the artificial intelligence of the artificial intelligence engine and its ability to discriminate between the state devoid of mechanical failure and states of mechanical failure, it is preferable to train the artificial intelligence engine both on the state devoid of mechanical failure and states of mechanical failure, thus implementing both steps 501 and 502.

In step 503, at least one property value of the reflected waves for the current state of the component is determined. For example, an actual time delay value is determined. This value is fed in step 504 in the artificial intelligence engine. The artificial intelligence engine determines in step 505 if the change is indicative of a mechanical failure. Such determination is a direct result of the artificial intelligence engine. If so, in step 506, a mechanical failure is reported. If not, the method continues with step 503.

The artificial intelligence engine may be implemented in central processing unit 51 or may be implemented as a separate component of the control and evaluation unit 5.

There exist multiple failure scenarios of why damage can be created to a gas turbine engine, such failure scenarios including a burst duct of a pressurized air pipe, a combustor burn through, a failed open bleed valve, a liquid (oil, flued, hydraulic fluid) pipe leak and a cooling system airflow failure.

Figure 6:
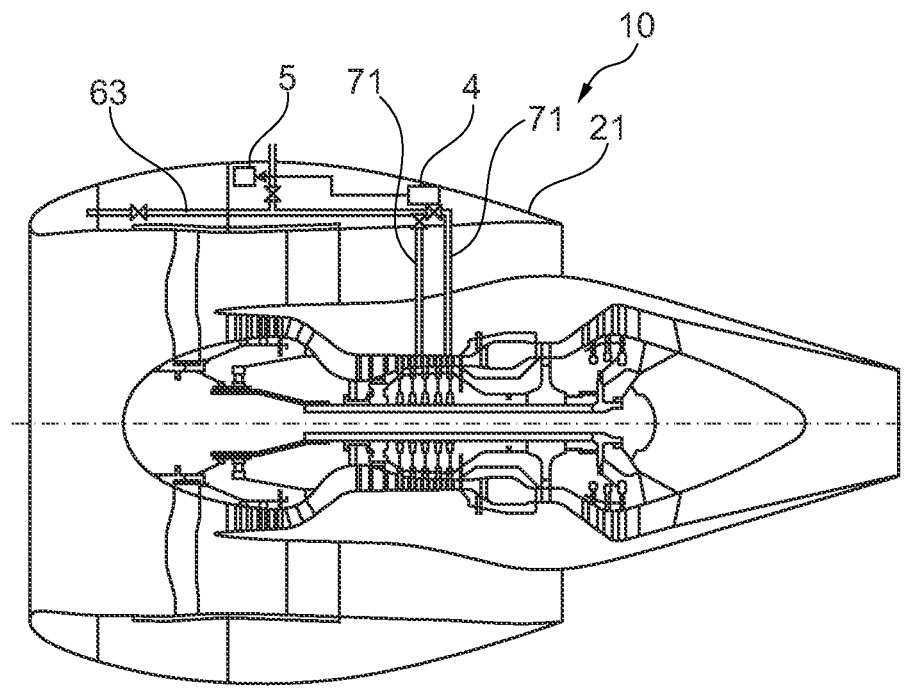
FIGS. 6, 7 is a gas turbine engine with a radar sensing element and an associated control and evaluation unit, wherein an air duct in a nacelle is monitored and a burst condition is detected.
Figure 7:
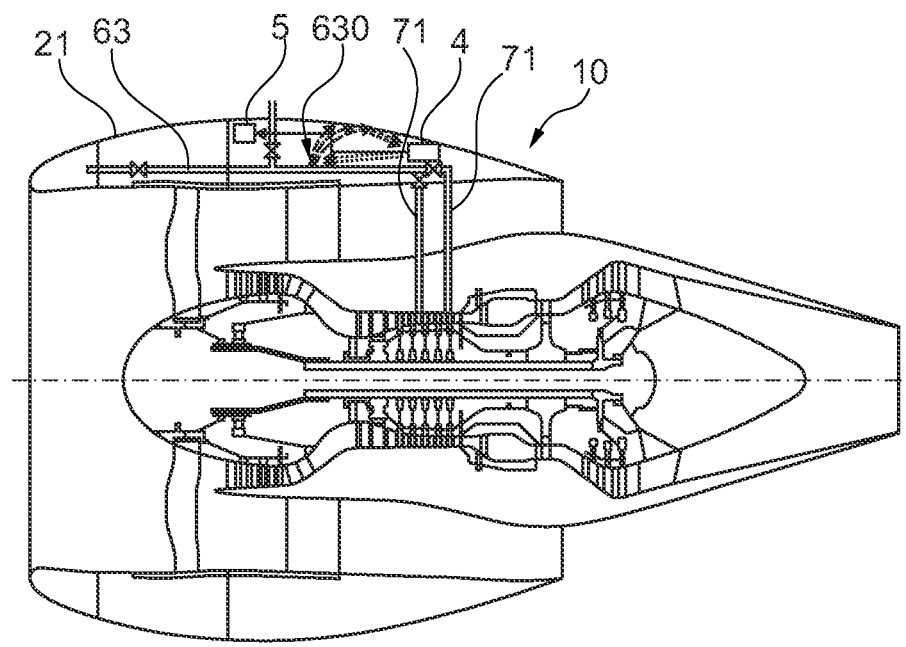

FIGS. 6 to 10 show embodiments in which the radar monitoring technology of the present invention allows the early detection of a nacelle damage due to hot air impingement. In FIGS. 6 and 7, a radar sensing element 4 is located in a rear part of a nacelle 21. An EEC 5 which serves as a control and evaluation unit in accordance with the present invention is also located in nacelle 21. Air ducts 71 provide bleed air from two compressor stages, wherein the bleed air is provided in a duct 63 to an environmental control system of an aircraft. The radar sensing element 4 is able to detect changes in the geometry in case of a leak 630 in duct 63, wherein the leak 630 itself and/or changes in the geometry of the hardware close to the leak can be detected by the radar sensing element 4. Such changes in geometry may be a delamination of parts and/or cracks.

In this respect, it is pointed out that, in an embodiment, the radar sensing element 4 may be configured to steer the beam of radio waves into different directions such that a high intensity beam can be directed to different areas and to different components.

Figure 8:
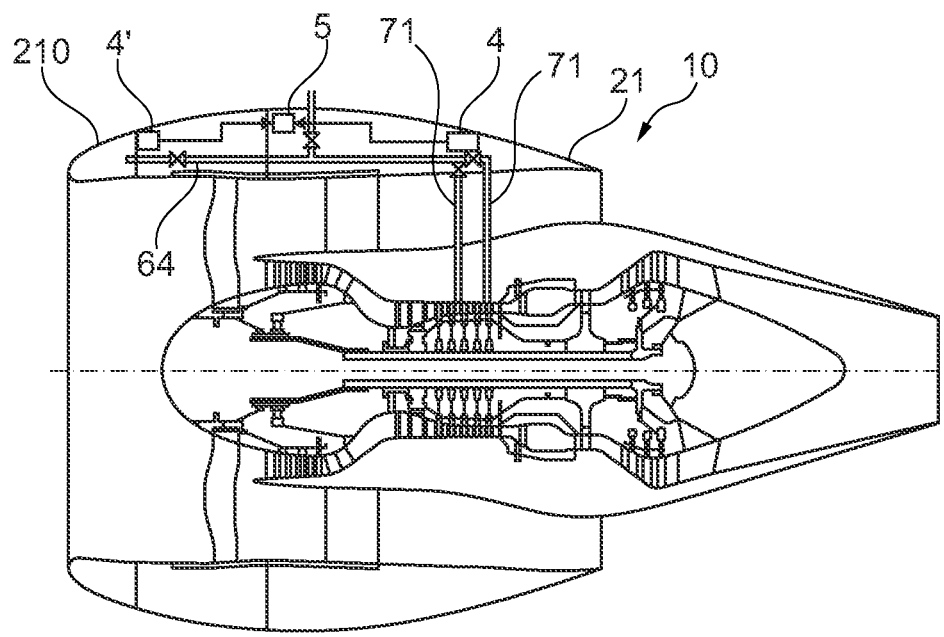
FIGS. 8, 9 is a gas turbine engine with a radar sensing element and an associated control and evaluation unit, wherein an anti-ice air duct in a nacelle is monitored and a burst condition is detected.
Figure 9:
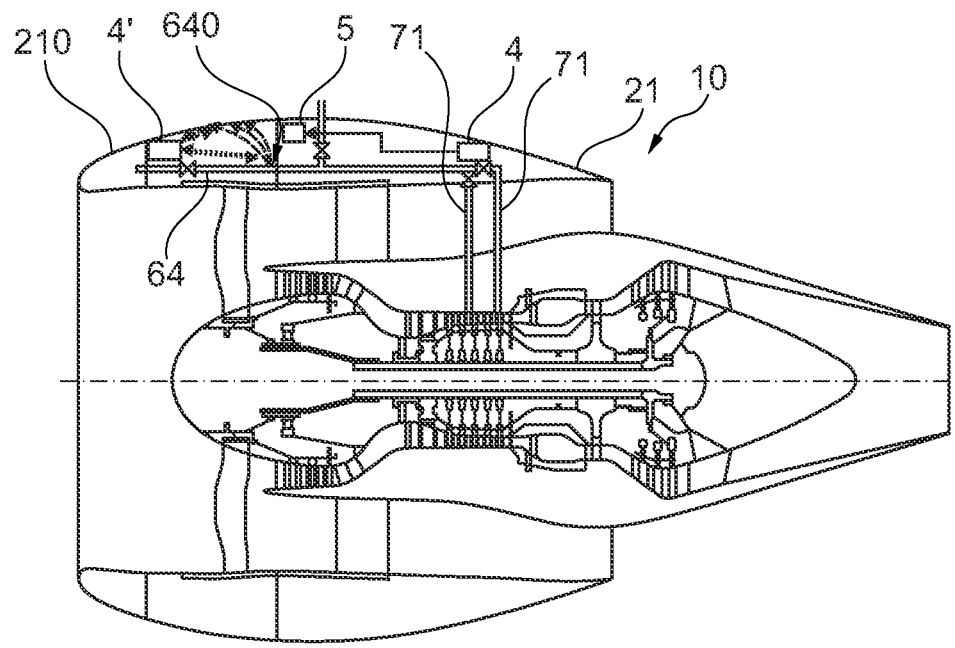

In FIGS. 8 and 9, compared to FIGS. 6 and 7, additionally a radar sensing element 4' is located in a front part of nacelle 21. Air ducts 71 provide bleed air from two compressor stages, wherein the bleed air is provided in a duct 64 towards the inlet lip 210 of the nacelle 21 in order to prevent the formation of ice at the inlet lip 210. The radar sensing element 4' is able to detect changes in the geometry in case of a leak 640 in duct 64, wherein the leak 640 itself and/or changes in the geometry of the hardware close to the leak can be detected by the radar sensing element 4'. Such changes in geometry may be a delamination of parts and/or cracks.

Figure 10:
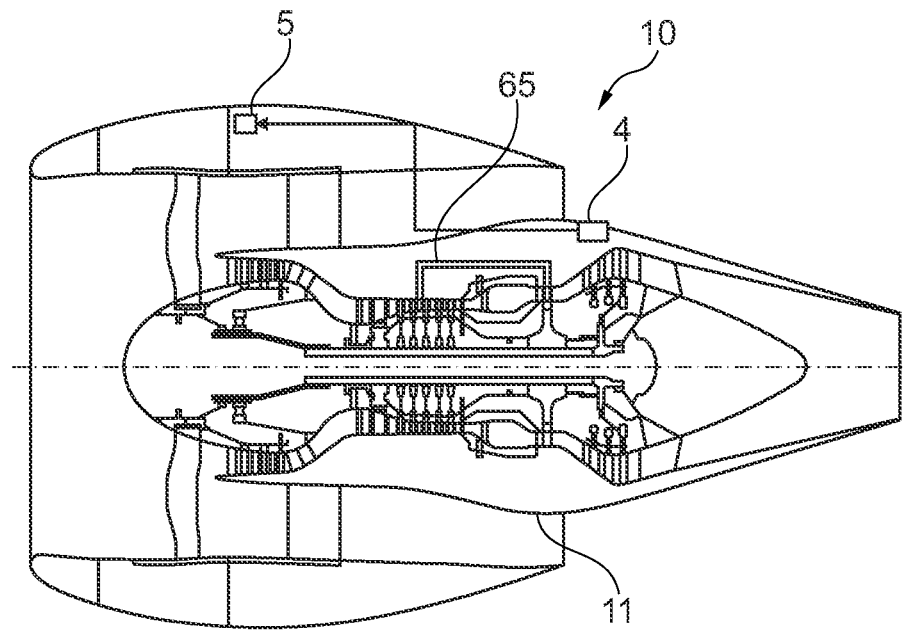
FIGS. 10, 11 is a gas turbine engine with a radar sensing element and an associated control and evaluation unit, wherein an air duct for providing cooling air to a turbine is monitored and a burst condition is detected.
Figure 11:
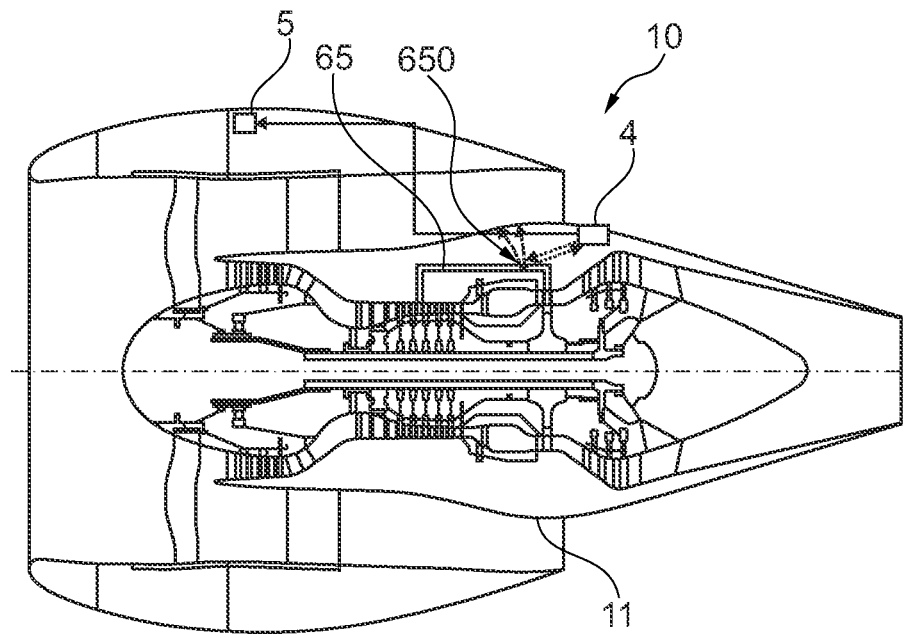

In FIGS. 10 and 11, a radar sensing element 4 is located in a compartment of the core engine 11. An EEC 5 which serves as a control and evaluation unit in accordance with the present invention is located in nacelle 21. An air duct 65 of a secondary air system provides cooling bleed air from a compressor stage to a turbine stage of the core engine 11. The radar sensing element 4 is able to detect changes in the geometry in case of a leak 650 in duct 65, wherein the leak 650 itself and/or changes in the geometry of the hardware close to the leak can be detected by the radar sensing element 4. Such changes in geometry may be a delamination of parts and/or cracks.

In FIGS. 12 and 13, similar as in FIGS. 10 and 11, a radar sensing element 4 is located in a compartment of the core engine 11. An EEC 5 which serves as a control and evaluation unit in accordance with the present invention is located in nacelle 21. A combustor 16 comprises an outer case 66. The radar sensing element 4 is able to detect changes in the geometry of the combustor case 66 in case of a leak 660, wherein the leak 660 itself and/or other changes in the geometry of the combustor case 66 and/or changes in the geometry of the hardware close to the leak can be detected by the radar sensing element 4. Such changes in geometry may be a delamination of parts and/or cracks.

In FIG. 14, a radar sensing element 4 is located in a rear part of a nacelle 21. An EEC 5 which serves as a control and evaluation unit in accordance with the present invention is also located in nacelle 21. A compressor bleed valve 67 is provided at compressor 15. If the bleed valve 67 has a failure in that it opens at high power for unlimited time, such opening will result in damage in the outer wall 68 of bypass duct 22, which will result in damage in the outer wall 62, including perforation and leaking of bypass air into the fan compartment. The changes in geometry associated there with can be detected by the radar sensing element 4. In this case, the radar sensing element 4 emits radio wave towards the wall 68 which represents the monitored component. In addition, a radar sensing element may be provided in proximity to bleed valve 67 to also monitor bleed valve 67.

It should be understood that the above description is intended for illustrative purposes only and is not intended to limit the scope of the present disclosure in any way. For example, it is pointed out that the present invention is not limited in its application to a propulsion system but may be implemented at the whole aircraft level. Other embodiments regard, among others, an anti-ice system in an aircraft wing or the cargo bay of the aircraft.

Also, those skilled in the art will appreciate that other aspects of the disclosure can be obtained from a study of the drawings, the disclosure, and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. A method of monitoring a component of an aircraft to detect a mechanical failure of the component, the method comprising:
   providing a radar sensing element installed within a portion of the aircraft that is configured to transmit and detect radio waves;
   determining a state devoid of mechanical failure of the component by interrogating the component by transmitting the radio waves from the radar sensing element to the component, detecting the radio waves reflected from the component, determining at least one property value of the reflected radio waves, and associating the at least one property value with a characteristic of the component in the state devoid of mechanical failure;
   subsequently determining a current state of the component by interrogating the component by transmitting the radio waves from the radar sensing element to the component, detecting the radio waves reflected from the component, and determining the at least one property value of the reflected radio waves;
   determining if the at least one property value identified in the current state of the component has changed from the at least one property value in the state devoid of mechanical failure in a manner indicative of a mechanical failure;
   wherein the component is a static component of the aircraft;
   wherein the at least one property value is indicative of at least one chosen from size, shape, orientation, material and distance of the component;
   wherein the mechanical failure includes at least one chosen from: a burst engine duct, a pressurized air duct, a combustor burn-through, a compressor bleed valve opening failure, a liquid pipe leak and a cooling system airflow failure in a gas turbine engine.

2. The method according to claim 1, wherein the determining if the at least one property value has changed in a manner indicative of a mechanical failure comprises determination if the at least one property value has changed in an amount that is above a predefined threshold, thereby identifying a mechanical failure.

3. The method according to claim 1, wherein the determining if the at least one property value has changed in a manner indicative of a mechanical failure comprises using an artificial intelligence engine that has been trained with at least one chosen from property value data indicative of the state devoid of mechanical failure and property value data indicative of states of mechanical failure.

4. The method according to claim 3, wherein the method includes configuring the artificial intelligence engine to employ at least one chosen from: supervised machine learning, recursive neural networks, unsupervised machine learning, and algorithmically-defined machine learning.

5. The method according to claim 1, wherein the at least one property value of the reflected radio waves is indicative of at least one chosen from size, shape, orientation, material, distance, and velocity of the component.

6. The method according to claim 1, wherein the component extends in space and in that the at least one property value of the component is determined for a plurality of different areas of the component.

7. The method according to claim 1, and further comprising at least one chosen from:
   the at least one property is time delay, wherein changes in the time delay between transmission of the radio waves and detection of the reflected radio waves is monitored,
   the at least one property is energy, wherein changes in the energy of the detected radio waves is monitored, and
   the at least one property is a frequency spectrum of the radio waves, wherein changes in the frequency spectrum of the detected radio waves are monitored.

8. The method according to claim 1, wherein the at least one property value includes a plurality of property values of the reflected radio waves that are determined to define the state devoid of mechanical failure and that the step of determining if the at least one property value has changed in a manner indicative of a mechanical failure comprises monitoring for changes of the plurality of property values to determine changes indicative of a mechanical failure.

9. A system of monitoring a component of an aircraft to detect a mechanical failure of the component, the system comprising:
   a radar sensing element installed within a portion of the aircraft that is configured to transmit and detect radio waves; and
   a control and evaluation unit in communication with the radar sensing element and receiving information from the radar sensing element;
   wherein the control and evaluation unit is configured to determine in cooperation with the radar sensing element a state devoid of mechanical failure of the component by interrogating the component by transmitting the radio waves from the radar sensing element to the component, detecting the radio waves reflected from the component, determining at least one property value of the reflected radio waves, and associating the at least one property value with a characteristic of the component in the state devoid of mechanical failure;
   wherein the control and evaluation unit is further configured to subsequently determine a current state of the component by interrogating the component by transmitting the radio waves from the radar sensing element to the component, detecting the radio waves reflected from the component, and determining the at least one property value of the reflected radio waves; and
   wherein the control and evaluation unit is further configured to determine if the at least one property value identified in the current state of the component has changed from the at least one property value in the state devoid of mechanical failure in a manner indicative of a mechanical failure;
   wherein the at least one property value is indicative of a presence of a liquid in a location where the liquid should not be present;
   wherein the at least one property value is indicative of at least one chosen from a burst engine duct, a pressurized air duct, a combustor burn-through, a compressor bleed valve opening failure, a liquid pipe leak and a cooling system airflow failure.

10. The system according to claim 9, wherein the control and evaluation unit is further configured to determine if the at least one property value has changed in a manner indicative of a mechanical failure in that it determines if the at least one property value has changed in an amount that is above a predefined threshold, thereby identifying a mechanical failure.

11. The system according to claim 9, wherein the control and evaluation unit is further configured to determine if the at least one property value has changed in a manner indicative of a mechanical failure by using artificial intelligence engine that has been trained with at least one chosen from property value data indicative of the state devoid of mechanical failure and property value data indicative of states of mechanical failure.

12. The system according to claim 9, wherein the control and evaluation unit is further configured to determine the at least one property value of the reflected radio waves is indicative of at least one chosen from size, shape, orientation, material, distance, and velocity of the component.

13. The system according to claim 9, wherein the radar sensing element is configured to steer a beam of the radio waves into different directions.

14. The system according to claim 9, wherein the control and evaluation unit is further configured to determine if the at least one property value has changed in a manner indicative of a mechanical failure by monitoring changes of a plurality of property values.

15. The system according to claim 9, wherein the at least one property value is indicative of at least one chosen from a fuel leak, an oil leak and a hydraulic fluid leak.

* * * * *